United States Patent
Zhou (10) Patent No.: US 10,452,176 B2
(45) Date of Patent: Oct. 22, 2019

(54) TOUCH SUBSTRATE AND MANUFACTURING METHOD THEREOF, AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Gang Zhou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 131 days.

(21) Appl. No.: 15/553,813

(22) PCT Filed: Feb. 16, 2017

(86) PCT No.: PCT/CN2017/073798
§ 371 (c)(1),
(2) Date: Aug. 25, 2017

(87) PCT Pub. No.: WO2018/000830
PCT Pub. Date: Jan. 4, 2018

(65) Prior Publication Data
US 2018/0246605 A1    Aug. 30, 2018

(30) Foreign Application Priority Data
Jun. 29, 2016 (CN) .......................... 2016 1 0500244

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01)

(58) Field of Classification Search
CPC ........... G06F 2203/04103; G06F 3/041; G06F 3/0412
See application file for complete search history.

(56) References Cited

U.S. PATENT DOCUMENTS

| 2011/0128252 | A1 | 6/2011 | Nah |
| 2012/0113021 | A1* | 5/2012 | Liu .......................... G06F 3/041 427/77 |

(Continued)

FOREIGN PATENT DOCUMENTS

| CN | 102190956 A | 9/2011 |
| CN | 103052931 A | 4/2013 |

(Continued)

OTHER PUBLICATIONS

The International Search Report and Written Opinion dated May 22, 2017; PCT/CN2017/073798.

(Continued)

*Primary Examiner* — Viet D Pham (57) ABSTRACT

A touch substrate and a manufacturing method thereof, and a touch display device are provided. The touch substrate includes: a bearing substrate; a touch electrode layer, disposed on the bearing substrate and including a first touch electrode, a side of the first touch electrode is inclined relative to the bearing substrate; and an antireflective layer, disposed on the bearing substrate and including an antireflective portion, the antireflective portion covers the side of the first touch electrode, and a refractive index of a film formed by both the antireflective portion and the first touch electrode is less than a refractive index of the first touch electrode.

15 Claims, 5 Drawing Sheets

(56) References Cited

U.S. PATENT DOCUMENTS

| | | | |
|---|---|---|---|
| 2013/0194220 A1 | 8/2013 | Lee et al. | |
| 2013/0277194 A1* | 10/2013 | Kim | G06F 3/041 |
| | | | 200/600 |
| 2014/0354906 A1 | 12/2014 | Wu et al. | |
| 2015/0109252 A1 | 4/2015 | Kanna et al. | |
| 2015/0251393 A1* | 9/2015 | Kanna | G06F 3/044 |
| | | | 428/334 |
| 2015/0253910 A1* | 9/2015 | Lee | G06F 3/044 |
| | | | 345/173 |
| 2017/0038872 A1* | 2/2017 | Jiang | G02F 1/133528 |

FOREIGN PATENT DOCUMENTS

| | | |
|---|---|---|
| CN | 104090675 A | 10/2014 |
| CN | 104216575 A | 12/2014 |
| CN | 104395867 A | 3/2015 |
| CN | 104699310 A | 6/2015 |
| CN | 104812569 A | 7/2015 |
| CN | 104898878 A | 9/2015 |
| CN | 106201071 A | 12/2016 |
| TW | 201131457 A | 9/2011 |

OTHER PUBLICATIONS

The First Chinese Office Action dated Jul. 4, 2018; Appln. No. 201610500244.5.

\* cited by examiner

TOUCH SUBSTRATE AND MANUFACTURING METHOD THEREOF, AND TOUCH DISPLAY DEVICE

TECHNICAL FIELD

Embodiments of the present disclosure relate to a touch substrate and a manufacturing method thereof; and a touch display panel.

BACKGROUND

With a rapid development of display technology, a touch screen has gradually spread throughout people's lives. The touch screen may be divided into an add-on touch screen, which integrates a touch structure with a protective substrate outside a display panel, and an on-cell touch screen and an in-cell touch screen, which integrate a touch structure with a display panel. In an on-cell touch screen, the touch structure is disposed on a side of an opposing substrate away from an array substrate of the display panel. In an in-cell touch screen, the touch structure is disposed between an opposing substrate and an array substrate of the display panel.

SUMMARY

Embodiments of the present disclosure provide a touch substrate and a manufacturing method thereof; and a touch display panel, so as to alleviate a vanishing phenomenon in the touch substrate.

At least one embodiment of the present disclosure provides a touch substrate, which comprises: a bearing substrate; a touch electrode layer, which is disposed on the bearing substrate and comprises a first touch electrode, a side of the first touch electrode is inclined relative to the bearing substrate; and an antireflective layer, which is disposed on the bearing substrate and comprises an antireflective portion, the antireflective portion covers the side of the first touch electrode, and a refractive index of a film formed by both the antireflective portion and the first touch electrode is less than a refractive index of the first touch electrode.

For example, the antireflective portion comprises a first layer, for incident light from a side of the antireflective portion away from the first touch electrode to the antireflective portion, and a product of thickness $d_1$ and a refractive index $n_1$ of the first layer is odd-multiple of $\lambda/4$, and $\lambda$ is a wavelength of the incident light.

For example, the antireflective portion is a monolayer film structure, and the refractive index of the antireflective portion is less than the refractive index of the first touch electrode.

For example, the antireflective portion is in direct contact with the first touch electrode; or the touch substrate further comprises a transparent interlayer, the transparent interlayer is disposed between the antireflective portion and the first touch electrode, and a refractive index of the transparent interlayer is equal to the refractive index of the first touch electrode.

For example, the side of the antireflective portion away from the first touch electrode is air, and a relationship of the refractive index $n_1$ of the antireflective portion and the refractive index n of the first touch electrode is $n_1=\sqrt{n}$; or the touch substrate further comprises a transparent film covering the antireflective portion, a relationship among a refractive index $n_0$ of the transparent film, and the refractive index $n_1$ of the antireflective portion and the refractive index n of the first touch electrode is $n_1=\sqrt{n_0 n}$.

For example, the antireflective portion further comprises a second layer, the second layer is located between the first layer and the first touch electrode; and a product of thickness $d_2$ and a refractive index $n_2$ of the second layer is odd-multiple of $\lambda/4$, the refractive index of the second layer is greater than the refractive index of the first layer; or, the product of the thickness $d_2$ and the refractive index $n_2$ of the second layer is even-multiple of $\lambda/4$, and the refractive index of the first layer is less than the refractive index of the first touch electrode.

For example, in a case that the product of the thickness $d_2$ and the refractive index $n_2$ of the second layer is odd-multiple of $\lambda/4$, the refractive index of the second layer is greater than the refractive index of the first touch electrode.

For example, the antireflective portion comprises a plurality of stacked composite layers, each of the composite layers comprises the first layer and a second layer with a refractive index greater than the refractive index of the first layer, the second layer of each of the composite layers is disposed between the first layer of the composite layer and the first touch electrode.

For example, the refractive index of the first layer is greater than 1 and less than 2.

For example, the refractive index of the first touch electrode is greater than 1.5.

For example, a surface of the antireflective portion away from the first touch electrode is parallel to the side of the first touch electrode which is covered by the antireflective portion.

For example, the antireflective layer further comprises a portion covering a top surface of the first touch electrode.

For example, the antireflective layer further comprises a black matrix, which is disposed on the bearing substrate and located on a side of the first touch electrode faced to the bearing substrate.

For example, the first touch electrode comprises a plurality of sub-electrodes arranged successively along a first direction and connected with each other, each of the sub-electrodes comprises a block subject portion and an extension portion connected with the block subject portion, and at least a side of the extension portion is provided with the antireflective layer.

For example, the touch electrode layer further comprises a second touch electrode, the second touch electrode extends along a second direction, and the second direction intersects the first direction.

At least one embodiment of the present disclosure further comprises a touch display device, which comprises any touch substrate as mentioned above.

For example, the touch display device further comprises a display panel, the display panel comprises an array substrate and an opposing substrate opposite to each other, and the first touch electrode and the antireflective layer included in the touch substrate are disposed on a side of the opposing substrate away from the array substrate.

At least one embodiment of the present disclosure further provides a manufacturing method of a touch substrate, which comprises: forming a touch electrode layer on a bearing substrate, the touch electrode layer comprising a first touch electrode, a side of the first touch electrode being inclined relative to the bearing substrate; and forming an antireflective layer on the first touch electrode, the antireflective layer comprising an antireflective portion, the antireflective portion covering the side of the first touch electrode. A refractive index of a film formed by both the antireflective portion and the first touch electrode is less than a refractive index of the first touch electrode.

Embodiments of the present disclosure provide a touch substrate and a manufacturing method thereof, and a touch display panel, by covering an antireflective portion on an inclined side of a touch electrode, and a refractive index of a film composed by both the antireflective portion and the touch electrode be less than a refractive index of the touch electrode, thus reflection of light on the side of the touch electrode can be reduced, so as to alleviate a vanishing phenomenon.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Over," "under," "right," "left" and the like are only used to indicate relative position relationship, and when the position of the object which is described is changed, the relative position relationship may be changed accordingly.

In a current on-cell touch screen, a touch electrode is usually formed by forming a transparent conductive film on a surface of a bearing substrate, and by exposing, developing, and etching the transparent conductive film. During a process of forming the touch electrode, because a slope is formed at an edge of the touch electrode, the slope reflects external light that is irradiated on the slope, so that a vanishing phenomenon (touch electrode reflection) may be caused, that is, in a case that a touch screen is not turn on, the touch screen still reflects the light.

Embodiments of the present disclosure provide a touch substrate and a manufacturing method thereof, and a touch display panel, an inclined side of a touch electrode is covered by an antireflective portion, and a refractive index of a film formed by both the antireflective portion and the touch electrode is less than a refractive index of the touch electrode, so that reflection of light on the side of the touch electrode can be reduced, so as to alleviate a vanishing phenomenon.

Figure 1:
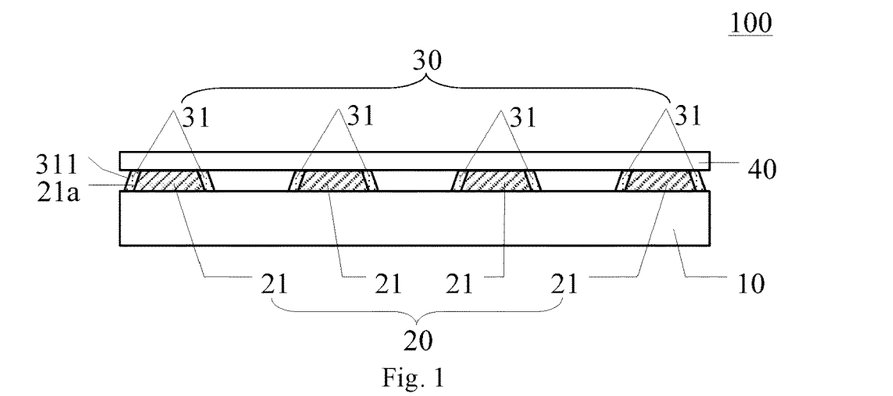
FIG. 1 is a sectional view of a touch substrate provided by an embodiment of the present disclosure.

As illustrated in FIG. 1, at least one embodiment of the present disclosure provides a touch substrate 100, which comprises a bearing substrate 10 (such as a glass substrate, a plastic substrate or a quartz substrate etc. and any type of substrate), and a touch electrode layer 20 and an antireflective layer 30 disposed on the bearing substrate 10. The touch electrode layer 20 comprises a first touch electrode 21, a side 21a of the first touch electrode 21 is inclined relative to the bearing substrate 10; the antireflective layer 30 comprises an antireflective portion 31, the antireflective portion 31 covers the side 21a of the first touch electrode 21, a surface 311 of the antireflective portion 31 away from the first touch electrode 21 is approximately parallel to the side 21a of the first touch electrode 21 covered by the antireflective portion 31, and a refractive index of a film formed by both the antireflective portion 31 and the first touch electrode 21 is less than a refractive index of the first touch electrode 21. In at least one embodiment of the present disclosure, the touch substrate 100 may further comprise a protective substrate 40 so as to protect the touch electrode layer 20.

It should be noted that, the number of the first touch electrode 21 and the antireflective portion 31 is at least one, FIG. 1 illustrates that the number of the first touch electrode 21 and the antireflective portion 31 is more than one as an example. A plurality of the first touch electrodes 21 spaced from each other illustrated in FIG. 1 may be formed by patterning a transparent conductive film such as exposing, developing, and etching etc. All sides of the first touch electrodes 21 may be covered by the antireflective layer 30 (as illustrated in FIG. 1), or a portion of the sides of the first touch electrodes 21 may be covered by the antireflective layer 30. A plurality of the antireflective portions 31 in FIG. 1 may be formed by patterning a transparent film. For example, the patterning process may comprise an exposure, a development, and an etching and other step(s).

Figure 2:
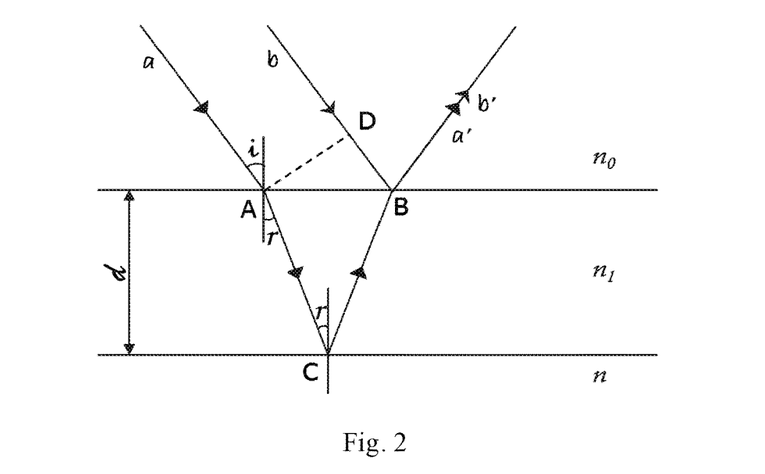
FIG. 2 is a schematic diagram of antireflective effect realized by an antireflective layer of a touch substrate in an embodiment of the present disclosure.

In combination with FIG. 2, the principle of reducing reflection of light on the side 21a of the first touch electrode 21 by the antireflective portion 31 is explained.

As illustrated in FIG. 2, a thickness of a film is d, a refractive index of the film is $n_1$, a refractive index of a medium under the film is n, a refractive index of a medium on the film is $n_0$. Two beams of parallel light a and b (whose wavelengths are λ) are gathered together after refraction and reflection of the film (reference to a'b'), and an optical path difference between the two beams is:

$$\delta = n_1(AC+CB) - DB$$

In a case that the optical path difference is equal to odd-multiple of ½ wavelength, that is:

$$\delta = (2k+1)\frac{\lambda}{2}, k = 0, 1, 2, 3, \ldots$$

Then the two beams of light interfere destructively, so that transmission light of the film can be enhanced. According to a formula above, the thickness of the film can be obtained:

$$d = (2k+1)\frac{\lambda}{4n_1}, k = 0, 1, 2, 3, \ldots$$

That is, in a case that the thickness d and the refractive index $n_1$ satisfy a condition that a product of d and $n_1$ is the odd-multiple of ¼ λ, a refractive index of a film formed by both the film and the medium under the film is less than the refractive index of the alone medium under the film, thus, the film is capable of reducing reflectivity.

As illustrated in FIG. 2, amplitudes of the two beams after reflection are:

$$A'_1 = r_1 A_1 = \left|\frac{n_0 - n_1}{n_0 + n_1}\right| A_1$$

$$A'_2 = t_1 r_2 t_2 A_1 = \frac{2n_0}{n_0 + n_1} \left|\frac{n_2 - n_1}{n_2 + n_1}\right| \frac{2n_1}{n_0 + n_1} A_1$$

Wherein, $r_1$ and $r_2$ are amplitude reflection coefficients, and $t_1$ and $t_2$ are amplitude coefficients, if $A'_1 = A'_2$, the two beams of reflection light interfere fully destructively (that is zero reflection), it can be calculated $$n_1 = \sqrt{n_0 n_2}$$

It can be known according to the content as mentioned above, the condition that a monolayer film satisfies zero reflection is: the refractive index $n_1$ and the thickness d satisfy:

$$n_1 = \sqrt{n_0 n_2}, d = (2k+1)\frac{\lambda}{4n_1}, k = 0, 1, 2, 3, \ldots$$

According to the principle as mentioned above, the refractive index and the thickness of the antireflective portion in an embodiment of the present disclosure are described in detail in conjunction with FIG. 3 to FIG. 7.

In at least one embodiment, the antireflective portion 31 may be a monolayer film structure. For example, as illustrated in FIG. 3 to FIG. 5, the antireflective portion 31 comprises a first layer 31a, for incident light (as indicated by an arrow) from a side of the antireflective portion 31 away from the first touch electrode 21 to the antireflective portion 31, it can be known according to the principle as mentioned above, a product of a thickness $d_1$ and a refractive index $n_1$ of the first layer 31 is odd-multiple of λ/4, λ is a wavelength of the incident light.

Figure 3:
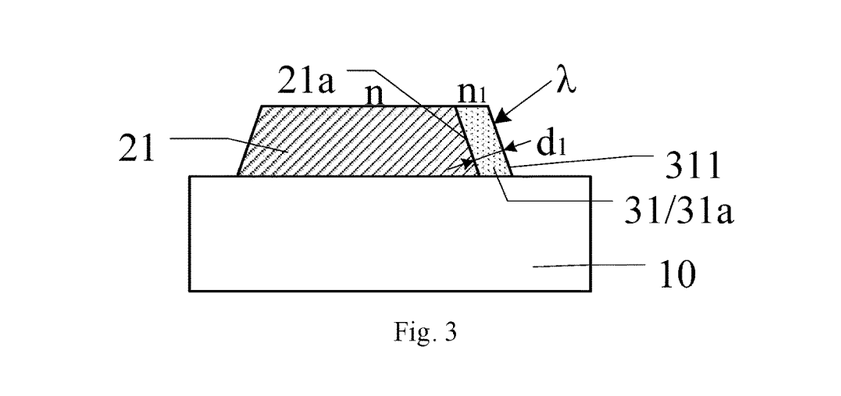
FIG. 3 is a first sectional view of a case that an antireflective portion of a touch substrate is a monolayer film structure in an embodiment of the present disclosure.
Figure 4:
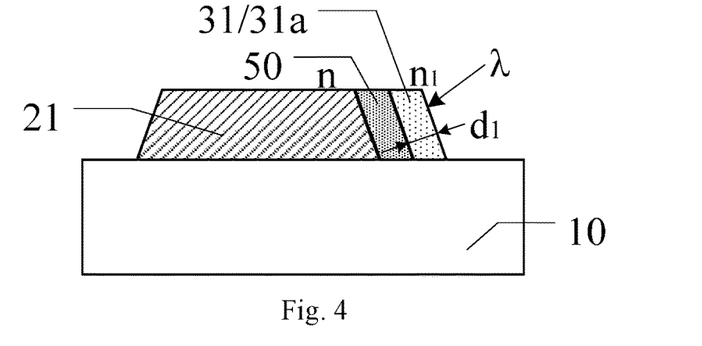
FIG. 4 is a second sectional view of a case that an antireflective portion of a touch substrate is a monolayer film structure in an embodiment of the present disclosure.
Figure 5:
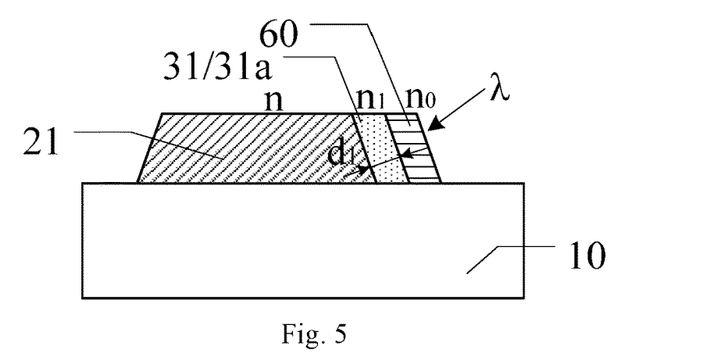
FIG. 5 is a third sectional view of a case that an antireflective portion of a touch substrate is a monolayer film structure in an embodiment of the present disclosure.

For example, the antireflective portion 31 may be in direct contact with the first touch electrode 21, as illustrated in FIG. 3 and FIG. 5, so as to avoid a film between the antireflective portion 31 and the first touch electrode 21 affecting antireflective effect of the antireflective portion 31. Certainly, in a case that a film between the antireflective portion 31 and the first touch electrode 21 dose not substantially affect the antireflective effect of the antireflective portion 31, the antireflective portion 31 may be indirectly contact with the first touch electrode 21. For example, as illustrated in FIG. 4, the touch substrate further comprises a transparent interlayer 50, the transparent interlayer 50 is disposed between the antireflective portion 31 and the first touch electrode 21, and a refractive index of the transparent interlayer 50 is approximately equal to the refractive index of the first touch electrode 21. The transparent interlayer 50 may be made of a conductive material or an insulating material etc. any transparent material, provided that the refractive index of the transparent interlayer 50 is approximately equal to the refractive index of the first touch electrode 21.

In a case that the antireflective portion 31 is a monolayer film structure, because the product of the thickness $d_1$ and the refractive index $n_1$ of the antireflective portion 31 (that is the first layer 31a) is odd-multiple of λ/4, the refractive index of the film formed by both the antireflective portion 31 and the first touch electrode 21 (its refractive index is n) is $n_{eq} = n_1^2/n$. Because the refractive index $n_{eq}$ of the film is less than the refractive index n of the first touch electrode 21, then it should be calculated that the refractive index $n_1$ is less than the refractive index n of the first touch electrode 21.

According to the zero reflection condition as mentioned above, in a case that the side of the antireflective portion 31 away from the first touch electrode 21 is air, for example, as illustrated in FIG. 3 and FIG. 4, because a refractive index of the air is 1, a relationship between the refractive index $n_1$ of the antireflective portion 31 (that is the first layer 31a) and the refractive index n of the first touch electrode 21 is $n_1 = \sqrt{n}$; in a case that the side of the antireflective portion 31 away from the first touch electrode 21 is a transparent film, for example, as illustrated in FIG. 5, the touch substrate provided by at least one embodiment of the present disclosure may further comprise a transparent film 60 covering the antireflective portion 31, a relationship among a refractive index $n_0$ of the transparent film 60, the refractive index $n_1$ of the antireflective portion 31 (that is the first layer 31a) and the refractive index n of the first touch electrode 21 is $n_1 = \sqrt{n_0 n}$.

For example, the refractive index $n_1$ of the first layer 31a of the antireflective portion 31 is greater than 1 and less than 2. For example, the first layer 31a may be made of a transparent material such as magnesium fluoride etc.

For example, the refractive index n of the first touch electrode 21 is greater than 1.5. For example, the first touch electrode 21 may be made of a transparent conductive material such as indium tin oxide (ITO) etc.

For example, in a case that the antireflective portion 31 is a monolayer film structure and the side of the antireflective portion 31 away from the first touch electrode 21 is air, as illustrated in FIG. 3 and FIG. 4, the first touch electrode 21 may be made of a material of p-ITO, a refractive index n of which is 1.7, the antireflective portion 31 may be made of a material of magnesium fluoride (MgF$_2$), a refractive index $n_1$ of which is 1.38, then the refractive index $n_{eq}$ of the film formed by both the antireflective portion 31 and the first touch electrode 21 satisfies $n_{eq}=1.38^2/1.7\approx1.12$, the refractive index $n_{eq}$ of the film is less the refractive index n of the first touch electrode 21, therefore, the refractive index of the film is reduced, so that the vanishing phenomenon may be alleviated.

For example, in a case that the antireflective portion 31 is a monolayer film structure and the side of the antireflective portion 31 away from the first touch electrode 21 is air, as illustrated in FIG. 3 and FIG. 4, the first touch electrode 21 may be made of a material of α-ITO, a refractive index n of which is 1.9, the antireflective portion 31 may be made of a material of magnesium fluoride (MgF$_2$), a refractive index $n_1$ of which is 1.38, then the refractive index $n_{eq}$ of the film formed by both the antireflective portion 31 and the first touch electrode 21 satisfies $n_{eq}=1.38^2/1.9\approx1.00<n$, and because $n_1\approx\sqrt{n}$, after increasing the antireflective layer, the film may basically realize zero reflection, so as to basically eliminate the vanishing phenomenon.

Figure 6:
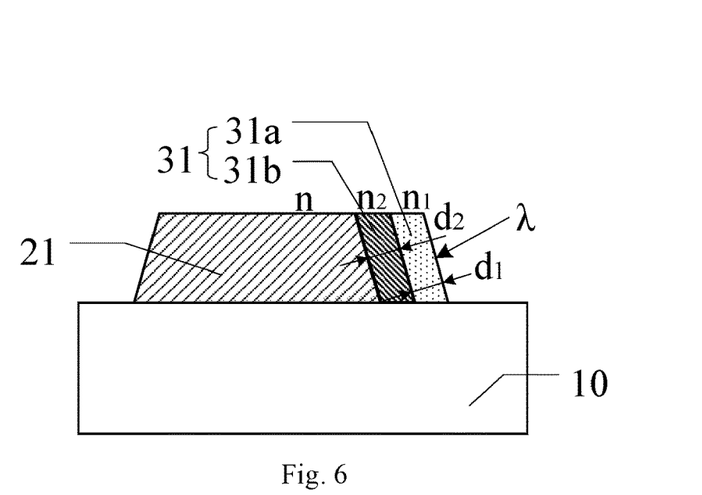
FIG. 6 is a sectional view of a case that an antireflective portion of a touch substrate is a bilayer film structure in an embodiment of the present disclosure.

In at least one embodiment, the antireflective portion 31 may be a bilayer film structure. For example, as illustrated in FIG. 6, the antireflective portion 31 comprises the first layer 31a and on the basis that the product of the thickness $d_1$ and the refractive index $n_1$ of the first layer 31a is odd-multiple of λ/4, the antireflective portion 31 may further comprise a second layer 31b, and the second layer 31b is located between the first layer 31a and the first touch electrode 21.

For example, a product of a thickness $d_2$ and a refractive index $n_2$ of the second layer 31b may be odd-multiple of λ/4, in the case, a refractive index of a film formed by both the second layer 31b and the first touch electrode 21 satisfies $n_{eq1}=n_2^2/n$, and the refractive index of the film formed by both the antireflective portion 31 and the first touch electrode 21 satisfies $n_{eq}=n_1^2/n_{eq1}=n\cdot n_1^2/n_2^2$, because $n_{eq}$ is less than the refractive index n of the first touch electrode 21, then it should be noted that the refractive index $n_2$ of the second layer 31b is greater than the refractive index $n_1$ of the first layer 31a. The antireflective portion 31 with the bilayer film structure may be realized by setting the refractive index of the second layer 31b to greater than the refractive index of the first layer 31a, and a relationship between each of the refractive index of the first layer 31a and the refractive index of the second layer 31b and the refractive index of the first touch electrode 21 is not required, thus, compared with the antireflective portion with the monolayer film structure, the antireflective portion with the bilayer film structure is easily realized.

For example, in a case that the product of the thickness $d_2$ and the refractive index $n_2$ of the second layer 31b is odd-multiple of λ/4, the refractive index $n_2$ of the second layer 31b may be greater than the refractive index n of the first touch electrode 21. In the monolayer film structure, a relationship between the refractive index $n_1$ of the first layer 31a and the refractive index n of the first touch electrode 21 is $n_1<n$; in the bilayer film structure provided by an embodiment of the present disclosure, a relationship between the refractive index $n_1$ of the first layer 31a and the refractive index $n_{eq1}$ of the film formed by both the second layer 31b and the first touch electrode 21 is $n_1<n_{eq1}$, and in a case that $n<n_2$, $n_{eq1}=n_2^2/n>n$, it should be known that, value range of the refractive index $n_1$ of the first layer 31a is wider in the bilayer film structure, so that the first layer 31a has a greater material selection range.

For example, the product of the thickness $d_2$ and the refractive index $n_2$ of the second layer 31b may be even-multiple of λ/4, and the refractive index $n_1$ of the first layer 31a may be less than the refractive index n of the first touch electrode 21. In the case, the size of the refractive index $n_2$ of the second layer 31b basically does not affect the antireflective effect of the antireflective portion 31, therefore, a setting mode of the first layer 31a in the bilayer film structure and the first touch electrode 21 may refer to a setting mode of the monolayer film structure as mentioned above. Furthermore, compared with the bilayer film structure as mentioned above in which the product of the thickness $d_2$ and the refractive index 112 of the second layer is odd-multiple of λ/4, the bilayer film structure in which the product of the thickness $d_2$ and the refractive index $n_2$ of the second layer is even-multiple of λ/4 may have better antireflective effect for incident light in larger wavelength range.

Figure 7:
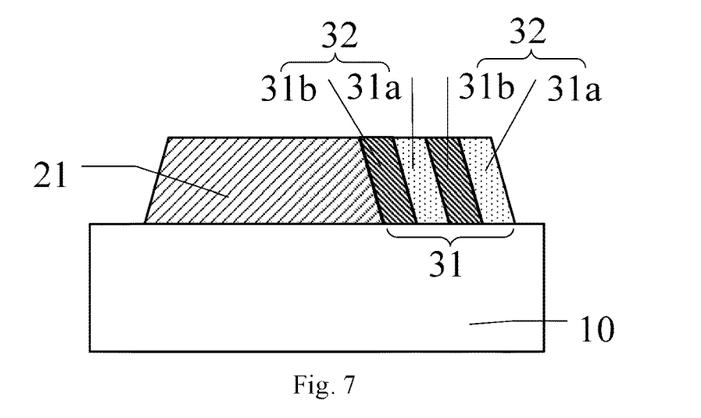
FIG. 7 is a sectional view of a case that an antireflective portion of a touch substrate comprises a plurality of composite layers in an embodiment of the present disclosure.

In at least one embodiment, the number of layers included in the antireflective portion 31 may also be more than 2. For example, as illustrated in FIG. 7, the antireflective portion 31 may further comprise a plurality of stacked composite layers 32, each of the composite layers 32 comprises the first layer 31a and the second layer 31b with a refractive index greater than the refractive index of the first layer 31a, the second layer 31b of each of the composite layers 32 is disposed between the first layer 31a of the composite layer 32 and the first touch electrode 21. The antireflective portion is provided with more layers, which can realize zero reflection of incident light with more wavelengths.

Figure 8:
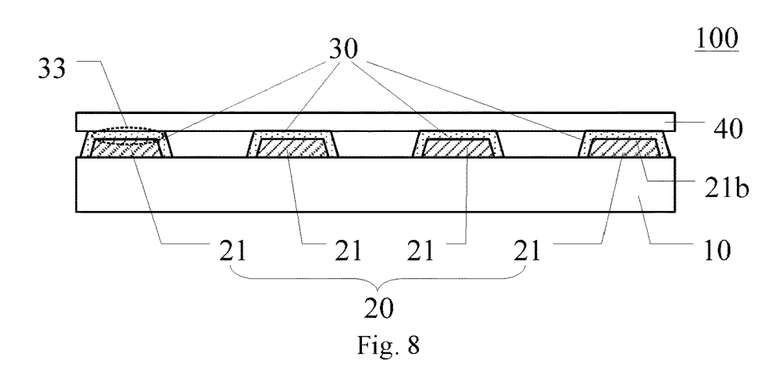
FIG. 8 is another sectional view of a touch substrate provided by an embodiment of the present disclosure.

In at least one embodiment, for example, as illustrated in FIG. 8, the antireflective layer 30 further comprises a portion 33 covering a top surface 21b of the first touch electrode 21, which can further improve the antireflective effect of the antireflective layer 30.

For example, in an embodiment illustrated in FIG. 8, the antireflective layer 30 may be formed by patterning a transparent film (for example, the patterning process may comprise an exposure, a development, an etching, and other step(s)), so as to make different portions of the antireflective layer 30 covering different first touch electrodes 21 be spaced from each other.

Figure 9:
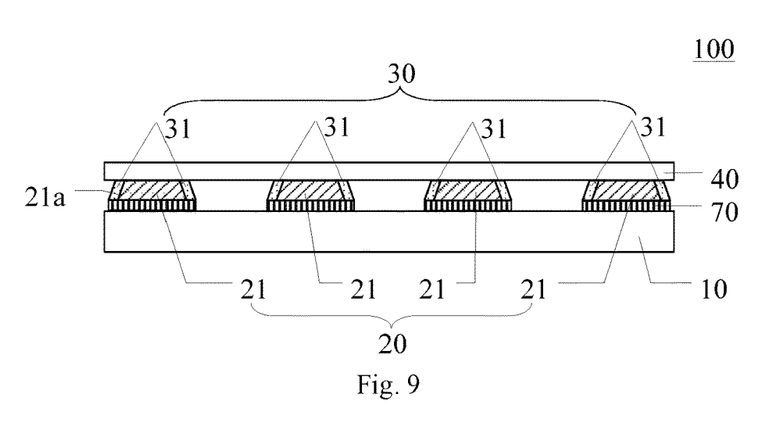
FIG. 9 is a sectional view of a case that a touch substrate comprises a black matrix provided by an embodiment of the present disclosure.

The touch substrate 100 provided by an embodiment of the present disclosure is mainly used in a structure that the touch electrode is disposed on the light exit side of the display panel in a case that the touch substrate is matched with a display panel, especially a structure that the touch electrode is not covered by a black matrix. For example, a structure that the touch electrode is not covered by a black matrix may be illustrated in FIG. 9, that is, the touch substrate 100 may further comprise a black matrix 70, which is disposed on the bearing substrate 10 and located on a side of the first touch electrode 21 faced to the bearing substrate 10. In FIG. 9, the black matrix 70 and the first touch control electrode 21 are both located on the same side of the bearing substrate 10, which is taken as an example to describe, certainly, the two may also be located at different sides of the bearing substrate 10.

Figure 10:
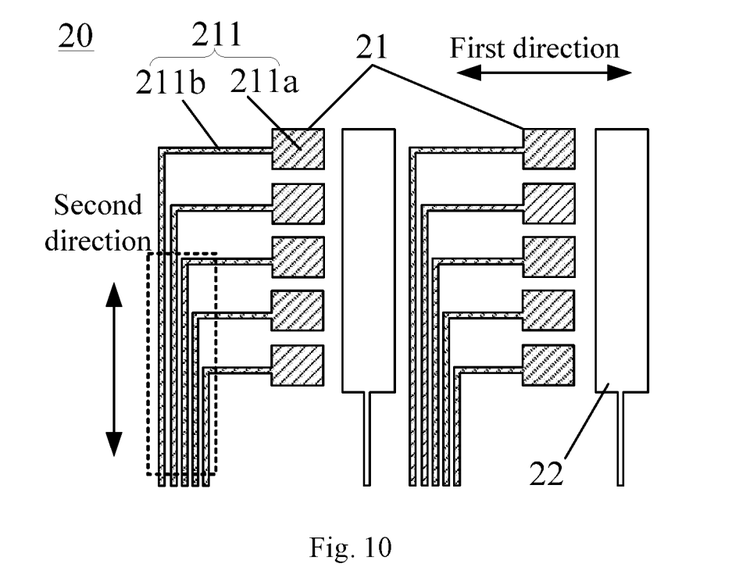
FIG. 10 is a top view of a touch electrode layer in a touch substrate provided by an embodiment of the present disclosure.

In at least one embodiment of the present disclosure, for example, as illustrated in FIG. 10, the first touch electrode 21 (FIG. 10 illustrates that the number of the first touch electrodes 21 is five) may comprise a plurality of sub-electrodes 211 arranged successively along a first direction and connected with each other, each of the sub-electrodes 211 comprises a block subject portion 211a and an extension portion 211b connected with the block subject portion 211a, at least a side (reference to 21a in FIG. 1) of the extension portion 211b is provided with the antireflective layer (not illustrated in FIG. 10). As illustrated in FIG. 10, a gap between the extension portions 211b of different first touch electrodes 21 is smaller, thus, the vanishing phenomenon is easily produced in a position (especially regions in which the extension portions are densely arranged, as illustrated in dashed lines frame in FIG. 10), where the extension portions 211b is located, therefore, the antireflective layer disposed on at least a side of the extension portions 211 can effectively reduce the vanishing phenomenon. Certainly, the antireflective layer may cover other regions of the touch electrode layer 20.

Furthermore, the touch electrode layer 20 may further comprise a second touch electrode 22 (FIG. 10 illustrates that the number of the second touch electrodes 22 is two), the second touch electrode 22 extends along a second direction, and the second direction intersects the first direction.

The touch electrode layer 20 provided by an embodiment of the present disclosure may use a principle of self capacitance, or a principle of mutual capacitance or other principle (s). And the structure of the touch electrode layer 20 includes but not limited to the structure illustrated in FIG. 10.

At least one embodiment of the present disclosure further provides a touch display device, which comprises the touch substrate 100 provided by any one of embodiments as mentioned above.

Figure 11A:
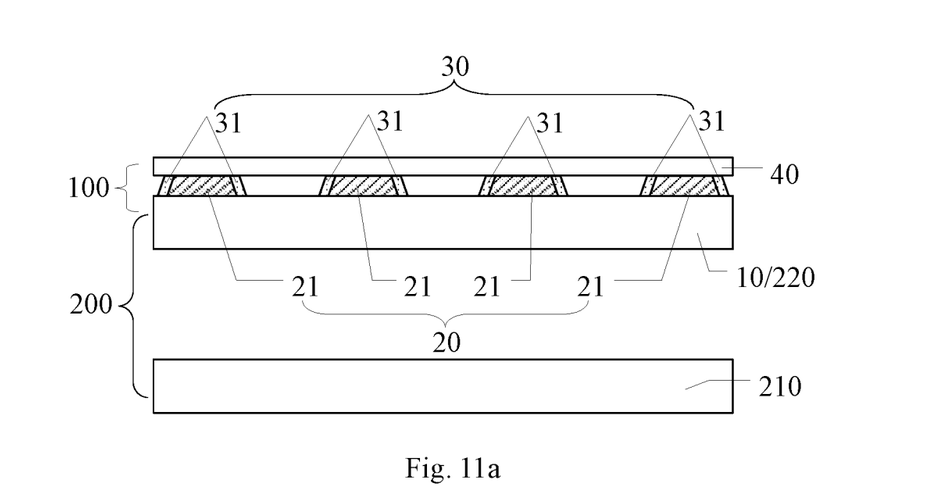
FIG. 11a is a sectional view of a touch display device provided by an embodiment of the present disclosure.
Figure 11B:
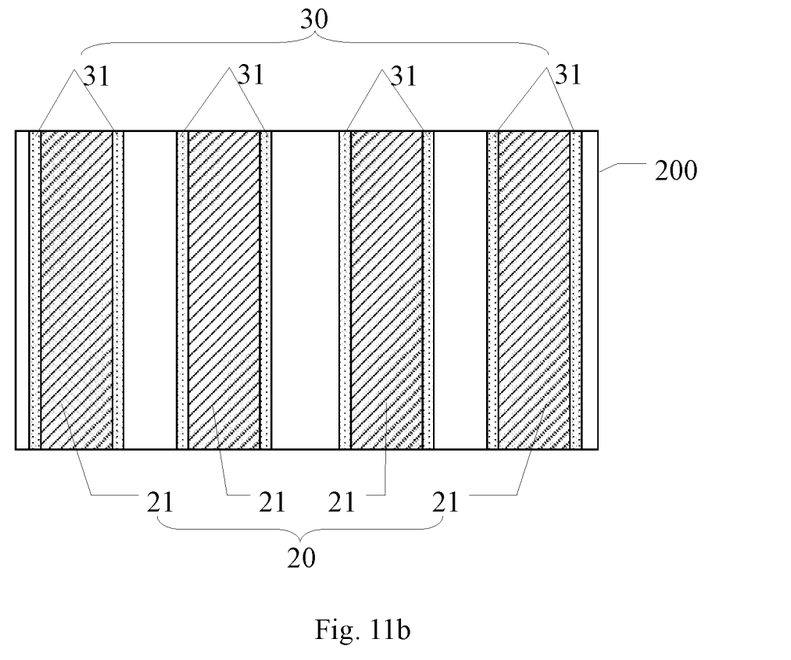
FIG. 11b is a top view of a touch display device provided by an embodiment of the present disclosure.

For example, as illustrated in FIG. 11a and FIG. 11b, the touch display device provided by at least one embodiment of the present disclosure further comprises a display panel 200, the display panel 200 comprises an array substrate 210 and an opposing substrate 220 (the opposing substrate 220 and the bearing substrate as mentioned above are the same substrate or different substrates) opposite to each other, the first touch electrode 21 and the antireflective layer 30 included in the touch substrate 100 are disposed on a side of the opposing substrate 220 away from the array substrate 210, that is, the first touch electrode 21 and the antireflective layer 30 are both disposed on the light exit side of the display panel 200.

For example, the display panel 200 may be a liquid crystal display panel or an OLED (organic light emitting diode) panel or other types of display panels.

The touch display device may be a liquid crystal display device, an electronic paper, an OLED display device, a mobile phone, a tablet computer, a TV, a display, a notebook computer, a digital photo frame, or any products or components having touch and display functions.

At least one embodiment of the present disclosure further provides a manufacturing method of a touch substrate, as illustrated in FIG. 1, the manufacturing method comprises: forming a touch electrode layer 20 on a bearing substrate 10, the touch electrode layer 20 comprising a first touch electrode 21, a side 21a of the first touch electrode 21 being inclined relative to the bearing substrate 10; and forming an antireflective layer 30 on the first touch electrode 21, the antireflective layer 30 comprising an antireflective portion 31, the antireflective portion 31 covering the side 21a of the first touch electrode 21. A refractive index of a film formed by both the antireflective portion 31 and the first touch electrode 21 is less than a refractive index of the first touch electrode 21.

For example, the touch electrode layer 20 may be formed by patterning a transparent conductive film such as an exposing, a developing, and an etching etc. steps. For example, the touch electrode layer 20 may further comprise a second touch electrode, and the second touch electrode intersects an extending direction of the first touch control electrode. The structures of the first touch electrode and the second touch electrode may refer to the relevant description in the above examples, and a repetition will not be repeated.

For example, the antireflective layer 30 may be formed by patterning a transparent film such as an exposing, a developing, and an etching etc. steps, so as to make different portions of the antireflective layer covering different first touch electrodes be spaced from each other.

In summary, in the touch substrate and the manufacturing method thereof, and the touch display device provided by embodiments of the present disclosure, the touch electrode layer and the antireflective layer are sequentially formed on the bearing substrate, the antireflective portion in the antireflective layer covers the side of the touch electrode in the touch electrode layer, through controlling the thickness and the refractive index of the antireflective portion, the refractive index of the film formed by both the antireflective portion and the touch electrode is less than the refractive index of the touch electrode, so as to alleviate the vanishing phenomenon and the display effect.

The embodiments of the touch substrate and the manufacturing method thereof, and the touch display device can be referred to each other. Furthermore, in a case of having no conflict, embodiments of the present disclosure and features of the embodiments can be combined with each other.

What are described above is related to the illustrative embodiments of the disclosure only and not limitative to the scope of the disclosure; the scopes of the disclosure are defined by the accompanying claims.

The present application claims priority to the Chinese patent application No. 201610500244.5, filed Jun. 29, 2016, the entire disclosure of which is incorporated herein by reference as part of the present application.

What is claimed is:

1. A touch substrate, comprising:
a bearing substrate;
a touch electrode layer, disposed on the bearing substrate and comprising a first touch electrode, wherein a side of the first touch electrode is inclined relative to the bearing substrate; and
an antireflective layer, disposed on the bearing substrate and comprising an antireflective portion, wherein the antireflective portion covers the side of the first touch electrode, and a refractive Index of a film formed by both the antireflective portion and the first touch electrode is less than a refractive Index of the first touch electrode,
wherein the antireflective portion comprises a first layer, for incident light from a side of the antireflective portion away from the first touch electrode to the antireflective portion, a product of a thickness $d_1$ and a refractive index $n_1$ of the first layer is an odd-multiple of $\lambda/4$, and $\lambda$ is a wavelength of the incident light, and
wherein the antireflective portion comprises a plurality of stacked composite layers, each of the composite layers comprises the first layer and a second layer with a refractive index greater than the refractive index of the first layer, and for each of the composite layers, the second layer is disposed between the first layer and the first touch electrode.

2. The touch substrate according to claim 1, wherein the refractive index of the first layer is greater than 1 and less than 2.

3. The touch substrate according to claim 1, wherein the refractive index of the first touch electrode is greater than 1.5.

4. A touch display device, comprising the touch substrate according to claim 3.

5. The touch display device according to claim 4, further comprising a display panel, wherein the display panel comprises an array substrate and an opposing substrate opposite to each other, and
the first touch electrode and the antireflective layer included in the touch substrate are disposed on a side of the opposing substrate away from the array substrate.

6. The touch substrate according to claim 1, wherein a surface of the antireflective portion away from the first touch electrode is parallel to the side of the first touch electrode which is covered by the antireflective portion.

7. The touch substrate according to claim 1, wherein the antireflective layer further comprises a portion covering a top surface of the first touch electrode.

8. The touch substrate according to claim 1, further comprising:
a black matrix, disposed on the bearing substrate and located on a side of the first touch electrode faced to the bearing substrate.

9. The touch substrate according to claim 1, wherein the first touch electrode comprises a plurality of sub-electrodes arranged successively along a first direction and connected with each other, each of the sub-electrodes comprises a block subject portion and an extension portion connected with the block subject portion, and at least a side of the extension portion is provided with the antireflective layer.

10. The touch substrate according to claim 9, wherein the touch electrode layer further comprises a second touch electrode, the second touch electrode extends along a second direction, and the second direction intersects the first direction.

11. The touch substrate according to claim 1, wherein
the antireflective portion is in direct contact with the first touch electrode; or
the touch substrate further comprises a transparent interlayer, the transparent interlayer is disposed between the antireflective portion and the first touch electrode, and a refractive Index of the transparent interlayer is equal to the refractive index of the first touch electrode.

12. The touch substrate according to claim 1, wherein the side of the antireflective portion away from the first touch electrode is air, and a relationship of the refractive index $n_3$ of the antireflective portion and the refractive index n of the first touch electrode is $n_3=\sqrt{n}$; or
the touch substrate further comprises a transparent film covering the antireflective portion, a relationship among a refractive index no of the transparent film, and the refractive index $n_3$ of the antireflective portion and the refractive index n of the first touch electrode is $n_3=\sqrt{n_0 n}$.

13. The touch substrate according to claim 1, wherein a product of a thickness $d_2$ and a refractive index $n_2$ of the second layer is an odd-multiple of $\lambda/4$ or, the product of the thickness $d_2$ and the refractive Index $n_2$ of the second layer is an even-multiple of $\lambda/4$, and the refractive index of the first layer is less than the refractive index of the first touch electrode.

14. The touch substrate according to claim 13, wherein in a case that the product of the thickness $d_2$ and the refractive index $n_2$ of the second layer is the odd-multiple of $\lambda/4$, and the refractive index of the second layer is greater than the refractive index of the first touch electrode.

15. A manufacturing method of a touch substrate, comprising:
forming a touch electrode layer on a bearing substrate, wherein the touch electrode layer comprises a first touch electrode, and a side of the first touch electrode is inclined relative to the bearing substrate; and
forming an antireflective layer on the first touch electrode, wherein the antireflective layer comprises an antireflective portion, the antireflective portion covers the side of the first touch electrode, and a refractive index of a film formed by both the antireflective portion and the first touch electrode is less than a refractive index of the first touch electrode;
wherein the antireflective portion comprises a first layer, for incident light from a side of the antireflective portion away from the first touch electrode to the antireflective portion, a product of a thickness $d_1$ and a refractive index $n_1$ of the first layer is an odd-multiple of $\lambda/4$, and $\lambda$ is a wavelength of the incident light; and
the antireflective portion comprises a plurality of stacked composite layers, each of the composite layers comprises the first layer and a second layer with a refractive Index greater than the refractive index of the first layer, and for each of the composite layers, the second layer is disposed between the first layer and the first touch electrode.

* * * * *